United States Patent Office 3,012,052
Patented Dec. 5, 1961

3,012,052
TRIALKYLSILOXANES AND THEIR PRODUCTION
Walter Simmler, Koln-Mulheim, Germany, assignor to Farbenfabriken Bayer Aktiengesellschaft, Leverkusen, Germany, a corporation of Germany
No Drawing. Filed Aug. 11, 1958, Ser. No. 754,127
Claims priority, application Germany Aug. 20, 1957
5 Claims. (Cl. 260—448.2)

The invention relates to the production of new siloxanes of the formula

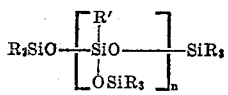

wherein R denotes an alkyl radical, especially methyl, R' denotes an aryl radical, especially phenyl, and $n$ is the number 1, 2 or 3. If R denotes methyl and R' denotes phenyl, the formula comprises the compounds tris-(trimethylsiloxy)-monophenylsilane, tetrakis-(trimethylsiloxy)-1,2-diphenyl-disiloxane and pentakis-(trimethylsiloxy)-1,2,3-triphenyl-trisiloxane.

According to the invention, these compounds are prepared in such a manner that mixtures of more than 1 mol and at most 3 mols of a hydrolyzable trialkylsilane and 1 mol of a hydrolyzable monoarylsilane are slowly reacted with as many moles of water as gram-atoms of oxygen are stoichiometrically required for the formation of the siloxane bonds. The water is either added dropwise or injected or combined by means of spraying nozzles with the likewise sprayed silane mixture which may be diluted with a solvent. The reaction is carried out at about room temperature; when chlorosilanes are employed, external cooling is rendered unnecessary by the evaporation of the hydrogen chloride formed during the reaction.

It is known that in the hydrolysis of silane mixtures which also contain aryl-substituted silanes, the difficulty is encountered of preventing the precipitation of solid, solely aryl-substituted silanols and siloxanes. It is surprising that in the hydrolysis according to the invention siloxanes free from appreciable portions of silanols are obtained without loss of arylsiloxane units by separation.

The new siloxanes according to the invention are valuable oils which are advantageously used as heat-transfer agents, as liquids in thermometers and thermo-regulators, especially because their coefficient of expansion is little dependent on the pressure.

They are also extremely suitable as working fluid for high vacuum diffusion pumps. It has been found that these new oils have an extremely steep rise of their vapour pressure with rising temperature as against comparable known fluids for high vacuum pumps consisting of phenyl-methyl siloxanes of a different structure. This means that, compared with other polysiloxane oils having the same vapour pressure at the condensing surface temperature of the pump, the oils according to the invention may more easily be evaporated because at a given pressure a lower temperature is required for their evaporation in the boiling vessel of the pump, thus involving a smaller loss of energy and greater protection of the pump, or because at a given temperature in the boiling vessel a more convenient pre-vacuum of between the fivefold and the tenfold pressure may be applied. When comparing them with the other oils at the same pressure and at the same temperature in the boiling vessel, a better final vacuum is thus attained.

|  | final vacuum mm. Hg | boiling temperature at 1 mm. Hg, ° C. |
|---|---|---|
| tris-(trimethylsiloxy)-monphenylsilane | $10^{-3}$ to $10^{-7}$ | 105 |
| tetrakis-(trimethylsiloxy)-1,2-diphenyldisiloxane | $10^{-6}$ to $10^{-7}$ | 175 |
| pentakis-(trimethylsiloxy)-1,2,3-triphenyl-trisiloxane | $10^{-7}$ to $10^{-8}$ | 220 |

The aforesaid oils remain liquid at room temperature and are at least as insensitive to heat and the access of air as the pumping fluids hitherto used. In addition, they may also be used as intermediates for the production of other polysiloxane oils, lacquers, resins and rubber.

The following example is given for the purpose of illustrating the invention.

EXAMPLE 2.61 kilograms of trimethylmonochlorosilane and 1.69 kilograms of phenyltrichlorosilane (molecular ratio 3:1) are placed in a 10-litre five-neck flask provided with stirrer, 2 condensers and a thermometer, and 0.45 kilogram of water injected with intensive stirring in the course of 3 hours. While the reaction proceeds, the mixture is cooled to a temperature below room temperature and hydrogen chloride escapes. The mixture is then heated to 100° C. for a further hour to expel the dissolved hydrogen chloride, and the residuary HCl is subsequently neutralized with sodium carbonate or an alcoholic sodium hydroxide solution. After filtration, the crude product is obtained in a yield of between 85 to 95 percent, and the compounds listed in Table 1 are obtained by fractional vacuum distillation.

When the molecular ratios of trimethylmonochlorosilane and water are chosen at 4:2:5 or 5:3:7 etc. instead of 3:1:3 and the process is otherwise carried out as described above, there are obtained the yields listed in Table 2 of the individual compounds $M_2(TM)_n$ wherein "M" denotes the siloxane unit $(CH_3)_3SiO_{1/2}$, and "T" denotes the siloxane unit $H_5C_6SiO_{3/2}$.

Table 1

| n | Compound | Type | Formula | Molecular weight Calcd. | Molecular weight Found | Percent C Calcd. | Percent C Found | Percent H Calcd. | Percent H Found | Boiling point (1 mm. Hg) ° C. |
|---|---|---|---|---|---|---|---|---|---|---|
| 1 | Tris-(trimethylsiloxy)-phenyl-silane | $M_3T$ | $C_{15}H_{32}O_3Si_4$ | 372 | 365 | 48.4 | 48.6 | 8.6 | 8.4 | 105 |
| 2 | Tetrakis-(trimethylsiloxy)-1,2-diphenyl-disiloxane | $M_4T_2$ | $C_{24}H_{46}O_5Si_6$ | 583 | 575 | 49.4 | 49.2 | 7.9 | 7.6 | 175 |
| 3 | Pentakis-(trimethylsiloxy)-1,2,3-triphenyl-trisiloxane | $M_5T_3$ | $C_{33}H_{60}O_7Si_8$ | 793 | 782 | 50.0 | 50.0 | 7.6 | 7.8 | 220 |
| 4 | Hexakis-(trimethylsiloxy)-1,2,3,4-tetraphenyl-trisiloxane | $M_6T_4$ | $C_{42}H_{74}O_9Si_{10}$ | 1003 | 976 | 50.2 | 49.9 | 7.4 | 7.7 | 255 |

Table 2
YIELDS DEPENDENT ON MOLAR RATIO OF COMPONENTS

| | Mixture in kg. of $Me_3SiCl+PhSiCl_3+H_2O$ | | | Molar ratio $Me_3SiCl:PhSiCl_3:H_2O$ | | | $M_2$ | | $M_3T$ | | $M_4T_2$ | | $M_5T_3$ | | $M_6T_4$ | | $M_2(TM)_x$ +residue | |
|---|---|---|---|---|---|---|---|---|---|---|---|---|---|---|---|---|---|---|
| | | | | | | | g | Percent | g | Percent | g | Percent | g | Percent | g | Percent | g | Percent |
| 1 | 2.61 | 1.69 | 0.45 | 3 | 1 | 3 | 18 | 0.7 | 811 | 33.8 | 660 | 27.5 | 160 | 6.7 | 300 | 12.5 | 450 | 18.7 |
| 2 | 2.6 | 2.55 | 0.55 | 4 | 2 | 5 | 105 | 3.7 | 640 | 22.9 | 520 | 18.6 | 280 | 10.0 | 185 | 6.6 | 1070 | 38.2 |
| 3 | 2.17 | 2.53 | 0.50 | 5 | 3 | 7 | 41 | 1.5 | 255 | 9.5 | 421 | 15.7 | 211 | 7.9 | 430 | 16.1 | 1322 | 49.4 |

I claim:
1. Process for the production of trialkylsiloxymonoarylsiloxanes of the general formula

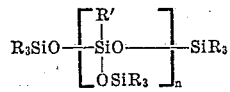

wherein R represents an alkyl radical, R' represents an aryl radical and $n$ is one of the numbers 1, 2 and 3, which comprises preparing a mixture of a trialkylmonochlorosilane and a monoaryltrichlorosilane in a proportion of more than 1 mol and at most 3 mols of the former for each mol of the latter, slowly adding water to said mixture in an amount of a half mol of $H_2O$ for each gram-atom of chlorine in the sum of said chlorosilanes, and then heating the mixture to about 100° C. until the evolution of hydrogen chloride is substantially completed.

2. The process according to claim 1, which comprises adding said water to said mixture at such a rate that the temperature thereof does not exceed room temperature.

3. The process according to claim 1, which comprises adding said water to said mixture under external cooling and thereby maintaining temperature of the mixture below room temperature.

4. Pentakis - (trimethylsiloxy) - 1,2,3 - triphenyltrisiloxane of boiling point 220° C. at 1 mm. Hg.

5. A working fluid for a high vacuum diffusion pump, consisting essentially of pentakis-(trimethylsiloxy)-1,2,3-triphenyltrisiloxane.

References Cited in the file of this patent
UNITED STATES PATENTS

| | | |
|---|---|---|
| 2,469,888 | Patnode | May 10, 1949 |
| 2,486,162 | Hyde | Oct. 25, 1949 |
| 2,530,356 | Hunter | Nov. 14, 1950 |
| 2,567,110 | Hyde | Sept. 4, 1951 |

OTHER REFERENCES

Meads et al.: "Jour. Chem. Soc." (London), vol. 107, (1915), pp. 459–68.

Andrianov et al.: "Jr. Obschei Chimie, SSSR," vol. 28, No. 2, February 1958, pp. 333–36.

UNITED STATES PATENT OFFICE
CERTIFICATE OF CORRECTION

Patent No. 3,012,052 December 5, 1961

Walter Simmler

It is hereby certified that error appears in the above numbered patent requiring correction and that the said Letters Patent should read as corrected below.

In the heading to the printed specification, line 7, for "Aug. 20, 1957" read -- Aug. 17, 1957 --; column 1, lines 21 and 22, after "trimethylsiloxy" insert a closing parenthesis; column 2, line 51, after "ane" insert -- , phenyltrichlorosilane --.

Signed and sealed this 24th day of April 1962.

(SEAL)
Attest:

ESTON G. JOHNSON

Attesting Officer

DAVID L. LADD

Commissioner of Patents